United States Patent
Xu

(10) Patent No.: US 10,435,620 B2
(45) Date of Patent: *Oct. 8, 2019

(54) TREATMENT FLUIDS COMPRISING WEAKLY EMULSIFYING SURFACTANTS AND ASSOCIATED METHODS

(71) Applicant: Multi-Chem Group, LLC, San Angelo, TX (US)

(72) Inventor: Liang Xu, Houston, TX (US)

(73) Assignee: Multi-Chem Group, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/888,213

(22) Filed: Feb. 5, 2018

(65) Prior Publication Data

US 2018/0155612 A1     Jun. 7, 2018

Related U.S. Application Data

(63) Continuation of application No. 14/778,236, filed as application No. PCT/US2014/033806 on Apr. 11, 2014, now Pat. No. 9,920,239.

(60) Provisional application No. 61/814,089, filed on Apr. 19, 2013.

(51) Int. Cl.
| | |
|---|---|
| *C09K 8/60* | (2006.01) |
| *E21B 43/267* | (2006.01) |
| *E21B 43/26* | (2006.01) |
| *C09K 8/584* | (2006.01) |
| *C09K 8/72* | (2006.01) |

(Continued)

(52) U.S. Cl.
CPC .............. *C09K 8/602* (2013.01); *C09K 8/584* (2013.01); *C09K 8/68* (2013.01); *C09K 8/72* (2013.01); *E21B 43/25* (2013.01); *E21B 43/26* (2013.01); *E21B 43/267* (2013.01)

(58) Field of Classification Search
None
See application file for complete search history.

(56) References Cited

U.S. PATENT DOCUMENTS

| | | |
|---|---|---|
| 5,355,958 A | 10/1994 | Pauls et al. |
| 5,427,699 A | 6/1995 | Pauls et al. |
| 5,543,387 A | 8/1996 | Mokadam et al. |

(Continued)

FOREIGN PATENT DOCUMENTS

| | | |
|---|---|---|
| CA | 2860429 A1 | 9/2013 |
| CA | 2868279 A1 | 10/2013 |

(Continued)

OTHER PUBLICATIONS

International Search Report issued in related PCT Application No. PCT/US2014/033806 dated Aug. 27, 2014, 3 pages.

(Continued)

*Primary Examiner* — John J Figueroa
(74) *Attorney, Agent, or Firm* — Tenley Krueger; Baker Botts L.L.P.

(57) ABSTRACT

Provided are acidic treatment fluids comprising a weakly emulsifying surfactant, an aqueous base fluid, and an acid. In some embodiments, the treatment fluids are capable of forming short-lived oil-in-acid emulsions due, at least in part, to the interaction of at least a portion of the weakly emulsifying surfactant with one or more oil or gas molecules within a subterranean formation.

5 Claims, 4 Drawing Sheets

(51) Int. Cl.
*C09K 8/68* (2006.01)
*E21B 43/25* (2006.01)

(56) References Cited

U.S. PATENT DOCUMENTS

| | | | |
|---|---|---|---|
| 5,797,456 | A | 8/1998 | Mokadam |
| 7,718,584 | B2 * | 5/2010 | Welton .................. C09K 8/506 504/203 |
| 2004/0023817 | A1 * | 2/2004 | Taylor ..................... C09K 8/28 507/200 |
| 2004/0147404 | A1 * | 7/2004 | Thaemlitz ................ C09K 8/26 507/100 |
| 2008/0119374 | A1 * | 5/2008 | Willberg ................. C09K 8/52 507/209 |
| 2011/0071056 | A1 * | 3/2011 | Saini ..................... C09K 8/035 507/119 |
| 2011/0120712 | A1 | 5/2011 | Todd et al. |
| 2012/0181027 | A1 | 7/2012 | Welton et al. |
| 2012/0318514 | A1 | 12/2012 | Mesher |
| 2013/0000913 | A1 | 1/2013 | Welton et al. |
| 2013/0067999 | A1 | 3/2013 | Xu et al. |

FOREIGN PATENT DOCUMENTS

| | | |
|---|---|---|
| RU | 2305277 C1 | 8/2007 |
| WO | 2006/051255 A1 | 5/2006 |
| WO | 2007/093767 A2 | 8/2007 |

OTHER PUBLICATIONS

Ku, Liang, "Weakly Emulsifying Surfactant Reduces Formation Damage and Enhances Well Productivity in Acid Stimulation", SPE Paper 165348, presented in Monterey, California, Apr. 19-25, 2013.
Leal, J.A. et al., "Post-Stimulation Fluid Recovery, Every Drop Counts: Case Histories from Saudi Arabia", SPE Paper 164004, presented in Muscat, Oman, Jan. 28-30, 2013.
O'Neil, Bill, et al., "Prevention of Acid Induced Asphaltene Preciptiation: A Comparison of Anionic vs. Cationic Surfactants", SPE Paper 164087, presented in The Woodlands, Texas, Apr. 8-10, 2013.
Sarma, Dilip Kumar, et al., "Development of a Deep-Penetrating Emulsified Acid and Its Application in a Carbonate Reservoir", SPE Paper 105502, presented in Bahrain, Mar. 11-14, 2007.
Office Action issued in related Canadian Application No. 2,907,379, dated Jul. 26, 2016 (4 pages).
International Preliminary Report on Patentability issued in related PCT application No. PCT/US2015/033806 dated Oct. 29, 2015 (12 pages).
Office Action issued in related Australian patent application No. 2014254270, dated Feb. 1, 2016 (3 pages).
Office Action issued in related Russian Application No. 2015139498, dated Sep. 16, 2016 (13 pages).
Office Action issued in related Colombian Application No. 15-221.710 (9 pages).

* cited by examiner

TREATMENT FLUIDS COMPRISING WEAKLY EMULSIFYING SURFACTANTS AND ASSOCIATED METHODS

CROSS-REFERENCE TO RELATED APPLICATIONS

The present application is a Continuation Application of U.S. National Stage application Ser. No. 14/778,236, filed 18 Sep. 2015 which is based on International Patent Application No. PCT/US2014/033806, filed 11 Apr. 2014 which claims the benefit of the filing of U.S. Provisional Patent Application Ser. No. 61/814,089, entitled "Treatment Fluids Comprising Weakly Emulsifying Surfactants and Associated Methods," filed on 19 Apr. 2013, all of which are incorporated herein by reference in their entirety for all purposes.

BACKGROUND

The present invention relates to methods and compositions for treating subterranean formations. More particularly, the present invention relates to treatment fluids that comprise a weakly emulsifying ("WE") surfactant, and associated methods.

Treatment fluids may be used in a variety of subterranean treatments. Such treatments include, but are not limited to, stimulation treatments and enhanced or improved oil recovery operations. As used herein, the term "treatment," or "treating," refers to any subterranean operation that uses a fluid in conjunction with a desired function and/or for a desired purpose. The term "treatment," or "treating," does not necessarily imply any particular action by the fluid.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. Once at least one fracture is created and the proppant particulates are substantially in place, the viscosity of the fracturing fluid usually is reduced, and the fracturing fluid may be recovered from the formation.

Another production stimulation operation that employs a treatment fluid is an acidizing treatment. In acidizing treatments, subterranean formations comprising acid-soluble components, such as those present in carbonate and sandstone formations, are contacted with a treatment fluid comprising an acid. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface, e.g., "flowing back" the well, leaving one or more voids (e.g., wormholes) within the formation, which enhance the formation's permeability and may increase the rate at which hydrocarbons may subsequently be produced from the formation. One method of acidizing, known as "fracture acidizing," comprises injecting a treatment fluid comprising an acid into the formation at a pressure sufficient to create or enhance one or more fractures within the subterranean formation. The acid treatment fluid may leave one or more voids within the formation in addition to the one or more fractures enhanced within the formation. Another method of acidizing, known as "matrix acidizing," comprises injecting the treatment fluid into the formation at a pressure below that which would create or enhance one or more fractures within the subterranean formation. This acidizing method may likewise leave one or more voids within the formation.

Surfactants are widely used in stimulation operations, including hydraulic fracturing and acidizing (both fracture acidizing and matrix acidizing) treatments. Surfactants may also be used in enhanced or improved oil recovery operations. Many variables may affect the selection of a surfactant for use in such treatments and operations, such as interfacial surface tension, wettability, compatibility with other additives (such as other additives used in acidizing treatments), and emulsification tendency. Many conventional treatments and operations such as hydraulic fracturing and acidizing treatments utilize non-emulsifying ("NE") surfactants in order to avoid the formation of tight emulsions between the oil and aqueous phases within a formation. Tight emulsions are thought to block the oil and gas flow by plugging the pore throats, voids, fractures, or other channels in the formation. This formation damage could drastically reduce production from the formation.

However, the use of NE surfactants in stimulation operations such as acidizing treatments may result in sub-optimal oil and/or gas flow from the formation.

BRIEF DESCRIPTION OF THE FIGURES

A more complete understanding of the present disclosure and advantages thereof may be acquired by referring to the following description taken in conjunction with the accompanying drawings, wherein.

Figure 1:
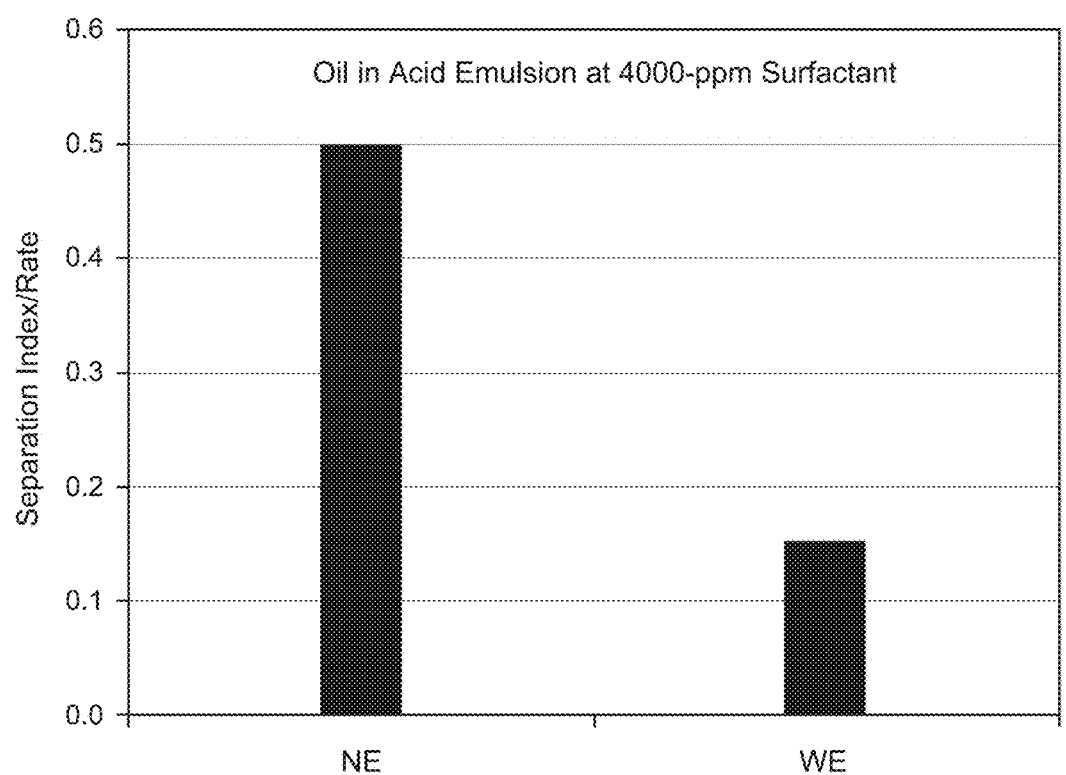
FIG. 1 is a graph illustrating a comparison of separation rates of oil and aqueous phases for both NE surfactant-containing and WE surfactant-containing acidic treatment fluids 10 minutes after mixing, as measured by an emulsion dispersion analyzer.

While the present invention is susceptible to various modifications and alternative forms, specific exemplary embodiments thereof have been shown by way of example in the drawings and are herein described in detail. It should be understood, however, that the description herein of specific embodiments is not intended to limit or define the invention to the particular forms disclosed, but on the contrary, the intention is to cover all modifications, equivalents, and alternatives falling within the spirit and scope of the invention as defined by the appended claims. The figures should in no way be used to limit the meaning of the claim terms.

The features and advantages of the present invention will be readily apparent to those skilled in the art upon a reading of the description of the preferred embodiments that follows.

DESCRIPTION OF PREFERRED EMBODIMENTS

The present disclosure relates to methods and compositions for treating subterranean formations. More particularly, the present disclosure relates to treatment fluids that comprise a WE surfactant, and associated methods.

The treatment fluids of the present disclosure generally comprise a WE surfactant and an aqueous base fluid. The treatment fluids of some embodiments may further comprise an acid. Additionally, other additives suitable for use in the particular application may be included in the treatment fluids of the present disclosure as recognized by one of ordinary skill in the art having the benefit of this disclosure.

Among the many potential advantages and benefits of the methods and fluids of the present disclosure, the WE surfactant of treatment fluids of some embodiments of the present disclosure may aid in the formation of one or more short-lived oil-in-acid or oil-in-water emulsions, which may enhance mobility of oil and/or gas in a subterranean formation while preventing or otherwise avoiding the formation of tight emulsions between the oil and aqueous phases within the formation. Specifically, the one or more oil-in-acid or oil-in-water emulsions formed by treatment fluids of some embodiments may lower the interfacial surface tension between oil and aqueous phases, thereby enhancing the tendency for oil and/or gas molecules to migrate from the interior of the formation to the wellbore. In addition, these short-lived oil-in-acid or oil-in-water emulsions may be capable of dispersing additional oil and/or gas droplets into the acid or water phase and enabling those oil and/or gas molecules to deform and squeeze through tiny pore spaces in the formation rocks. In some embodiments, the WE surfactant of the treatment fluid is capable of adsorbing on either or both of a rock surface of the subterranean formation and one or more oil and/or gas molecules within the subterranean formation, so as to increase the probability of stripping oil and/or gas from rocks within the subterranean formation. In some embodiments, short-lived oil-in-acid or oil-in-water emulsions may additionally or instead temporarily delay acid spending, thereby potentially leading to the creation of larger voids, or wormholes, in the rock of the formation.

The WE surfactants of certain treatment fluids of the present disclosure may be capable of preventing and/or dispersing acid-induced sludge. Acid-induced sludge may cause significant well damage during acidizing treatments by, for example, plugging pore spaces in the subterranean formation, thereby preventing or substantially hindering the flow of oil and/or gas through the formation to the wellbore. It is believed that acid-induced sludge may form during acid stimulation because of the interaction between strong acid in acidic treatment fluids (e.g., 15% HCl acid) and asphaltene or paraffin compounds in the oil and/or gas. See Reitjens, M. and Nieuwpoort, M. 1999. Acid-Sludge: How Small Particles Can Make a Big Impact. Paper SPE 54727 presented at the SPE European Formation Damage Conference, The Hague, The Netherlands, 31 May-1 June. http://dx.doi.org/10.2118/54727-MS (also available http://www.onepetro.org/mslib/servlet/onepetropreview?id=00054727&soc=SPE). The sludge could become large enough to plug off pore spaces in the formation, causing formation damage. In some embodiments, WE surfactants may be capable of diffusing to the interface between oil and aqueous phases in order to counteract or otherwise prevent the effect of asphaltene or paraffin compounds on the interface, thereby preventing them from coming out of the oil phase. This may, in some embodiments, permit the use of acidic treatment fluids without the need for additional anti-sludge agents. Similarly, the presence of a WE surfactant in certain treatment fluids of the present disclosure may eliminate the need to additionally include penetrating surfactants in the treatment fluid of those embodiments.

Accordingly, treatment fluids of some embodiments of the present disclosure may provide significant advantages in oil and/or gas production over the use of treatment fluids that instead comprise NE surfactants. NE surfactants, in contrast to the WE surfactants of some embodiments of the present disclosure, are typically used to inhibit any degree of formation of emulsions, including oil-in-acid, oil-in-water, or other oil-in-aqueous phase emulsions. For example, FIG. 1 shows a comparison of emulsion tendency between NE surfactant-containing treatment fluids and WE surfactant-containing treatment fluids. Specifically, FIG. 1 shows oil in acid separation rates as determined using an emulsion dispersion analyzer at 10 minutes after mixing with a treatment fluid containing either a NE surfactant or a WE surfactant (and which was otherwise substantially identical) at 4,000 ppm (0.4%) surfactant loading. As shown in FIG. 1, the treatment fluid containing WE surfactant has a lower separation rate on the index (scale of 0-1) as quantified by the emulsion dispersion analyzer, as compared to the separation rate for the treatment fluid containing the NE surfactant. The lower separation rate of the WE-containing fluids may indicate, among other things, that the WE surfactant has a greater emulsion tendency than does the NE surfactant.

WE surfactants suitable for use in some embodiments of the present disclosure include any surfactant capable of forming relatively short-lived, or transient, oil-in-acid, oil-in-water, or other oil-in-aqueous phase emulsions. In some embodiments, suitable WE surfactants may be characterized by their capability to form oil-in-acid or oil-in-water emulsions that break and reform whenever the emulsion is subjected to shear forces. Thus, in some embodiments, use of a treatment fluid including the WE surfactant in a formation may result in emulsions that break apart and reform when subjected to shear flow in the formation.

In some embodiments, whether a surfactant will function as a WE surfactant may depend upon one or more characteristics of the crude oil and/or gas of the formation (such as any one or more of the characteristics of crude oil and/or gas in a formation discussed herein). Thus, in some embodiments, crude oil analysis may be required to determine a suitable WE surfactant for use in a formation comprising the analyzed crude oil. Further, in some embodiments, a surfactant's suitability to function as a weakly emulsifying surfactant may be confirmed by appropriate testing, such as dynamic surface tension, interfacial surface tension, wettability, emulsification tendency and/or sludge tendency tests, which are known in the art. See, e.g., Xu, L. and Fu, Q. 2012. Ensuring Better Well Stimulation in Unconventional Oil and Gas Formations by Optimizing Surfactant Additives. Paper SPE 154242 prepared for presentation at the SPE Western Regional Meeting held in Bakersfield, Calif., USA 19-23 Mar. 2012; Grattoni, C. A., Chiotis, E. D., and Dawe, R. A. 1995. Determination of Relative Wettability of Porous Sandstones by Imbibition Studies. *Journal of Chem. Tech. and Biotech.*, 64 (1): 17-24. doi: 10.1002/jctb.280640104; Hirasaki, G., Zhang, D. L. 2004. Surface Chemistry of Oil Recovery From Fractured, Oil-Wet, Carbonate Formations. *SPE Journal*, 9 (2): 15-162. doi: 10.2118/88365-PA; Somasundaran, P. and Zhang, L. 2006. Adsorption of Surfactants on Minerals for Wettability Control in Improved Oil Recovery Processes. *Journal of Petroleum Science and Engineer-*

*ing*, 52 (1-4): 198-212. doi:10.1016/j.petrol.2006.03.022; Tadros, T. F. 2005. Applied Surfactants: Principles and Applications, Wiley-VCH; Tongcumpou, C., Acosta, E. J., Quencer, L. B., Joseph, A. F., Scamehorn, J. F., Sabatini, D. A., Yanumet, N. and Chavadej, S. 2005. Microemulsion Formation and Detergency with Oily Soils: III. Performance and Mechanisms. *Journal of Surfactants and Detergents*, 8 (2):147-156. doi: 10.1007/s11743-005-340-8. One of ordinary skill in the art with the benefit of this disclosure will recognize how to determine whether a surfactant is suitably weakly emulsifying for a particular crude oil.

The WE surfactant may in some embodiments be cationic, while in other embodiments it may be anionic, or in yet other embodiments, amphoteric, zwitterionic, or non-ionic, respectively. In some embodiments, the desired ionization, if any, of the WE surfactant may be determined based at least in part upon one or more characteristics of the oil and/or gas of a subterranean formation. For example, the charge of a WE surfactant of some embodiments of the treatment fluid may be such that the WE surfactant is capable of inducing pair interactions (such as, e.g., electrostatic interactions) with one or more molecules of oil and/or gas in the subterranean formation. The mechanism of paired interaction has been discussed by Salehi et al., where they demonstrate the two main mechanisms responsible for the wettability alteration for oil wet and mixed wet formation rocks are ion-pair formation and adsorption of surfactant molecules through interactions with the adsorbed crude oil components on the rock surface. See Salehi, M., Johnson, S. J., and Liang, J. T. 2008. Mechanistic Study of Wettability Alteration using Surfactants with Applications in Naturally Fractures Reservoirs. *Langmuir* 24 (24): 14099-107, http://dx/doi/org/10.1021/1a802464u (also available http://pubs.acs.org/doi/abs/10.1021/1a802464u). For example, by using an anionic surfactant that pairs with cationic oil molecules by means of electrostatic interactions, the probability of stripping oil from rocks increases.

Thus, where the oil and/or gas of a subterranean formation contains predominantly alkaline compounds, which are typically positively charged in nature, the WE surfactant of some embodiments of the present disclosure may be anionic so as to be capable of inducing electrostatic pair interactions with positively-charged oil and/or gas molecules. In other instances, the oil and/or gas of a subterranean formation may contain a mixture of alkaline and acidic compounds. In such a circumstance, it may be advantageous to use an amphoteric and/or zwitterionic WE surfactant according to some embodiments of the present disclosure.

Furthermore, the amphoteric and/or zwitterionic WE surfactants of some embodiments may exhibit different charge and/or reactivity at different ranges of pH. For instance, some WE surfactants that are amphoteric and/or zwitterionic at pH less than about 2 may become anionic, cationic, or non-ionic at pH greater than about 2. Because the downhole pH may change during acidization (for example, pH may rise from in the range of 0-1, to about 4, as the acid is spent), the characteristics of WE surfactants of some embodiments may change during the process of an acidization treatment.

Other characteristics of oil and/or gas within the formation that might affect the determination of desired WE surfactant charge include, but are not limited to: weight percentages of saturates, aromatics, resins and asphaltenes.

Suitable non-ionic WE surfactants of some embodiments may include, but are not limited to: ethoxylated alcohols and polyglucosides. In some embodiments, non-ionic WE surfactants may include ethoxylated long-chain alcohols (e.g., ethoxylated dodecanol). Ethoxylation may take place at any point along the alcohol. Suitable cationic WE surfactants of some embodiments may include, but are not limited to: alkyl ammonium bromides. In some embodiments, the alkyl chain of the alkyl ammonium bromide may be anywhere from 1 to 50 carbons long, and be branched or un-branched. Thus, an example embodiment may include an alkyl ammonium bromide that comprises a 16-carbon chain alkyl component (e.g., cetyl trimethyl ammonium bromide). Suitable anionic WE surfactants of some embodiments may include, but are not limited to: alkyl sulfonates (e.g., methyl sulfonate, heptyl sulfonate, decylbenzene sulfonate, dodecylbenzene sulfonate, etc.) and alkoxylated sulfates. Suitable amphoteric and/or zwitterionic WE surfactants of some embodiments may include, but are not limited to, hydroxysultaines (e.g., cocoamidopropyl hydroxysultaine, lauramidopropyl hydroxysultaine, lauryl hydroxysultaine, etc.).

In some embodiments, the WE surfactant may be present in a treatment fluid in an amount sufficient to form one or more relatively short-lived oil-in-acid or oil-in-water emulsions within a subterranean formation. For example, in some embodiments, the WE surfactant may be present in the treatment fluid in an amount of from about 0.1 to 50 gallons of surfactant per thousand gallons of acid, water, and/or other aqueous base fluid ("gpt"), or put another way, approximately 100 to 50,000 ppm. In other example embodiments, the WE surfactant may be present in the treatment fluid in an amount of from about 2 to 40 gpt (approximately 2,000 ppm to 40,000 ppm), or in other embodiments, from about 3 to 25 gpt (approximately 3,000 ppm to about 25,000 ppm). In some embodiments, the WE surfactant may be present in the treatment fluid in an amount of from about 4 gpt to about 18 gpt (approximately 4,000 ppm to 18,000 ppm). In some embodiments, WE surfactant may be added to a treatment fluid in place of one or more other components that would otherwise conventionally be present (e.g., penetrating surfactants or anti-sludge agents). In such embodiments, an amount of WE surfactant on the higher end of the above ranges may be desired.

The aqueous base fluid used in some embodiments of the treatment fluids of the present disclosure may comprise fresh water, saltwater (e.g., water containing one or more salts dissolved therein), brine (e.g., saturated saltwater), seawater, or any combination thereof. Generally, the water may be from any source, provided that it does not contain components that might adversely affect the stability of the treatment fluids of the present disclosure. One of ordinary skill in the art, with the benefit of this disclosure, will recognize what components might adversely affect the stability and/or performance of the treatment fluids of the present disclosure.

The acid optionally used in some embodiments of the treatment fluids of the present disclosure may comprise any acid suitable for use in acidizing treatments, such as matrix acidizing or fracture acidizing. Examples of suitable acids for use in various embodiments include, but are not limited to: hydrochloric acid, hydrofluoric acid, formic acid, acetic acid, citric acid, glycolic acid, hydroxyacetic acid, lactic acid, hydrofluoric acid, 3-hydroxypropionic acid, carbonic acid, and ethylenediaminetetraacetic acid. An example of a suitable commercially available acid is "VOLCANIC ACID II™" available from Halliburton Energy Services, Inc. Alternatively or in combination with one or more acids, the treatment fluids of the present disclosure may comprise a salt of an acid. A "salt" of an acid, as that term is used herein, refers to any compound that shares the same base formula as the referenced acid, but one of the hydrogen cations thereon is replaced by a different cation (e.g., an antimony, bismuth, potassium, sodium, calcium, magnesium, cesium, or zinc cation). Examples of suitable salts of acids include, but are not limited to, sodium acetate, sodium formate, sodium citrate, sodium hydroxyacetate, sodium lactate, sodium fluoride, sodium propionate, sodium carbonate, calcium acetate, calcium formate, calcium citrate, calcium hydroxyacetate, calcium lactate, calcium fluoride, calcium propionate, calcium carbonate, cesium acetate, cesium formate, cesium citrate, cesium hydroxyacetate, cesium lactate, cesium fluoride, cesium propionate, cesium carbonate, potassium acetate, potassium formate, potassium citrate, potassium hydroxyacetate, potassium lactate, potassium fluoride, potassium propionate, potassium carbonate, magnesium acetate, magnesium formate, magnesium citrate, magnesium hydroxyacetate, magnesium lactate, magnesium fluoride, magnesium propionate, magnesium carbonate, zinc acetate, zinc formate, zinc citrate, zinc hydroxyacetate, zinc lactate, zinc fluoride, zinc propionate, zinc carbonate, antimony acetate, antimony formate, antimony citrate, antimony hydroxyacetate, antimony lactate, antimony fluoride, antimony propionate, antimony carbonate, bismuth acetate, and bismuth formate, bismuth citrate, bismuth hydroxyacetate, bismuth lactate, bismuth fluoride, bismuth carbonate, and bismuth propionate. The treatment fluids of some embodiments of the present disclosure may include any combination of two or more acids and/or salts thereof.

The optional acid (and/or salts thereof) may be present in the treatment fluid of some embodiments of the present disclosure in an amount sufficient to make the treatment fluid acidic. In some embodiments, the pH may be less than about 7. In other embodiments, the pH of the treatment fluid may be less than about 6, or in other embodiments, less than about 5. In some embodiments, the treatment fluid may be strongly acidic (e.g., having a pH less than about 3, or in other embodiments, less than about 2). In some embodiments, pH may be approximately 0. So, for example, in some embodiments the acid (and/or salts thereof) may be present in the range of from about 1% by weight of the treatment fluid to about 30% by weight of the treatment fluid. In certain embodiments, the acid (and/or salts thereof) may be present in the treatment fluid in the range of from about 5% by weight of the treatment fluid to about 20% by weight of the treatment fluid. In other embodiments, the treatment fluid may be 100% acid (prior to addition of WE surfactant and any other additives discussed herein).

The treatment fluids of some embodiments may include solvents, such as xylene, toluene, aromatics, or butyl glycol. Thus, for example, a treatment fluid of some embodiments may include ethylene glycol mono-butyl ether.

The treatment fluids of some embodiments may include particulates (such as proppant particulates or gravel particulates) suitable for use in subterranean applications. Particulates suitable for use in the present disclosure may comprise any material suitable for use in subterranean operations. Suitable particulate materials include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The particulate size generally may range from about 2 mesh to about 400 mesh on the U.S. Sieve Series; however, in certain circumstances, other sizes may be desired and will be entirely suitable for practice of the present disclosures. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of some embodiments of the present disclosure may be coated with any suitable resin or tackifying agent known to those of ordinary skill in the art.

The treatment fluids of some embodiments may additionally or instead include one or more of a variety of well-known additives, such as gel stabilizers, salts, fluid loss control additives, scale inhibitors, organic corrosion inhibitors, catalysts, clay stabilizers, biocides, bactericides, friction reducers, gases, foaming agents, iron control agents, solubilizers, pH adjusting agents (e.g., buffers), and the like. In certain embodiments, the treatment fluids may include salts (e.g. $MgCl_2$) that may, inter alia, prevent the precipitation of calcium when such treatment fluids are used to acidize formations containing calcium carbonate. Those of ordinary skill in the art, with the benefit of this disclosure, will be able to determine the appropriate additives for a particular application.

The treatment fluids of the present disclosure may be prepared by any suitable method. In some embodiments, the treatment fluids may be prepared on the job site. As an example of such an on-site method, a WE surfactant may be added to a treatment fluid (e.g., a hydraulic fracturing fluid, a fracture acidizing fluid, or a matrix acidizing fluid) during pumping.

Furthermore, additional additives, as discussed above, may be combined with the treatment fluid and/or the aqueous base fluid as desired. For example, a particulate additive (e.g., a particulate scale inhibitor) or particulates (e.g., gravel particulates or proppant particulates) may be suspended in the treatment fluid. In some embodiments, to facilitate mixing with the aqueous base fluid and the acid, the WE surfactant may be combined with a surfactant solubilizer prior to its combination with the other components of the treatment fluid. The surfactant solubilizer may be any suitable surfactant solubilizer, such as water, simple alcohols, and any combination thereof. For example, in some embodiments, the WE surfactant may be provided in a mixture that comprises the surfactant solubilizer and the WE surfactant. One of ordinary skill in the art, with the benefit of this disclosure, will be able to determine other suitable methods for preparation of the treatment fluids.

The present disclosure in some embodiments provides methods for using the treatment fluids to carry out a variety of subterranean treatments, including but not limited to, hydraulic fracturing treatments and acidizing treatments. In some embodiments, the treatment fluids of the present disclosure may be used in treating a portion of a subterranean formation, for example, in acidizing treatments such as matrix acidizing or fracture acidizing. In certain embodiments, a treatment fluid that comprises a WE surfactant and an aqueous base fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

In some embodiments, the treatment fluid further comprising an acid may be introduced at a pressure sufficient to cause at least a portion of the treatment fluid to penetrate at least a portion of the subterranean formation, and the treatment fluid may be allowed to interact with the subterranean formation so as to create one or more voids in the subterranean formation (for example, in acidizing treatments). Introduction of the treatment fluid may in some of these embodiments be carried out at or above a pressure sufficient to create or enhance one or more fractures within the subterranean formation (e.g., fracture acidizing). In other embodiments, introduction of the treatment fluid may be carried out at a pressure below that which would create or enhance one or more fractures within the subterranean formation (e.g., matrix acidizing).

In some instances, the treatment fluid may facilitate the formation of relatively short-lived oil-in-acid and/or oil-in-water emulsions due, at least in part, to the interaction of at least a portion of the WE surfactant with at least a portion of oil and/or gas molecules within the formation. In some embodiments, at least a portion of the WE surfactant may diffuse to an interface between oil and aqueous phases within the subterranean formation in order to counteract or otherwise prevent the formation of acid-induced sludge. In some embodiments, the WE surfactant of the treatment fluid may instead or in addition facilitate one or more pair interactions (such as electrostatic interactions) between at least a portion of the treatment fluid and at least a portion of oil and/or gas molecules in the formation. Furthermore, the treatment fluid of some embodiments may delay acid spending due at least in part to the presence of the WE surfactant.

The methods of some embodiments may also or instead include introducing into a subterranean formation a treatment fluid that comprises a WE surfactant, an aqueous base fluid, and an acid, in the absence of any additional anti-sludge agents; and allowing at least a portion of the treatment fluid to interact with at least a portion of the oil and/or gas of the subterranean formation so as to prevent the formation of acid-induced sludge.

The methods of some embodiments may also or instead include introducing into a subterranean formation a treatment fluid that comprises a WE surfactant and an aqueous base fluid, in the absence of any additional penetrating surfactants; and allowing the WE surfactant to facilitate the penetration of at least a portion of the subterranean formation by at least a portion of the treatment fluid.

The methods of some embodiments may also or instead include using the treatment fluid in enhanced or improved oil recovery operations.

Furthermore, any or all of the treatment fluids used in the aforementioned methods of some embodiments of the present disclosure may in other embodiments further include any one or more of the previously discussed additional additives (e.g., gel stabilizers, salts, fluid loss control additives, scale inhibitors, organic corrosion inhibitors, catalysts, clay stabilizers, biocides, bactericides, friction reducers, gases, foaming agents, iron control agents, solubilizers, pH adjusting agents (e.g., buffers), and the like).

In some embodiments, the present disclosure provides a method comprising: providing a treatment fluid that comprises a weakly emulsifying surfactant, an aqueous base fluid, and an acid; and introducing the treatment fluid into at least a portion of a subterranean formation.

In other embodiments, the present disclosure provides a method comprising: providing a treatment fluid that comprises a weakly emulsifying surfactant and an aqueous base fluid; and introducing the treatment fluid into at least a portion of a subterranean formation at or above a pressure sufficient to create or enhance one or more fractures in the subterranean formation.

In other embodiments, the present disclosure provides a treatment fluid comprising: a weakly emulsifying surfactant, an aqueous base fluid, an acid, and a weakly-emulsifying surfactant selected from the group consisting of: ethoxylated long-chain alcohols, polyglucosides, alkyl ammonium bromides; alkyl sulfonates; alkoxylated sulfates; hydroxysultaines; and any combination thereof.

To facilitate a better understanding of the present invention, the following examples of preferred embodiments are given. In no way should the following examples be read to limit, or define, the scope of the invention.

EXAMPLES

Example 1

Oil Composition Analysis. Four crude oil samples were taken from four separate wells in the Monterrey Formation in California, numbered 1, 2, 3, and 4. Oil composition analysis was performed by following standard titration for determining acid and base numbers. Table 1 shows the results of oil composition analysis for four crude oils. In Table 1, API Gravity shows the American Petroleum Institute Gravity (a measure of density of a petroleum liquid relative to water, where 10 is equal to water's density); % Mass shows the amount of paraffin and asphaltene in the oil on a % mass basis; Acid No. is a measure of acidity based upon the amount of KOH (in mg) needed to neutralize the acids per gram of oil; and Base No. is the amount of KOH (in mg) per gram of oil.

TABLE 1

OIL COMPOSITION ANALYSIS FOR FOUR CRUDE OILS

| Well ID | API Gravity | % Mass Paraffin | % Mass Asphaltene | Acid No., mg KOH/g | Base No, mg KOH/g |
| --- | --- | --- | --- | --- | --- |
| No. 1 | 49.5 | 3.10 | 0.50 | 0.19 | 1.61 |
| No. 2 | 46.6 | 1.90 | 0.80 | 0.10 | 1.04 |
| No. 3 | 21.3 | 8.50 | 3.10 | 1.09 | 3.40 |
| No. 4 | 25.4 | 2.10 | 4.60 | 0.96 | 9.54 |

The compositions of crude oils can vary significantly in terms of total acid and base numbers, even in the same formation. The oil analysis suggests that the oils from the four sample wells contain predominantly alkaline compounds, which are typically positively charged in nature. Thus, it was determined that a negatively charged WE surfactant could be used to induce extensive pair interactions with oil molecules.

Sludge and Emulsion Tendency Tests. Sludge and emulsion tendency tests were conducted on oils from Well No. 1 and Well No. 3, respectively, by mixing equal volumes of crude oils and 15% HCl acid for at least 30 min at reservoir temperature. A total of 4,000 ppm of the same non-ionic NE surfactant was added to the acid phase, and the acid phase was then mixed with each of the Well No. 1 and the Well No. 3 crude oil samples. Likewise, a total of 4,000 ppm of the same WE surfactant (here, lauryl hydroxysultaine) was added to the acid phase, and the acid phase was then mixed with each of the Well No. 1 and the Well No. 3 crude oil samples. Spent acid was prepared by adding $MgCl_2$ and $CaCl_2$ to 15% HCl acid, in which the pH was raised to 4.0.

Figure 2:
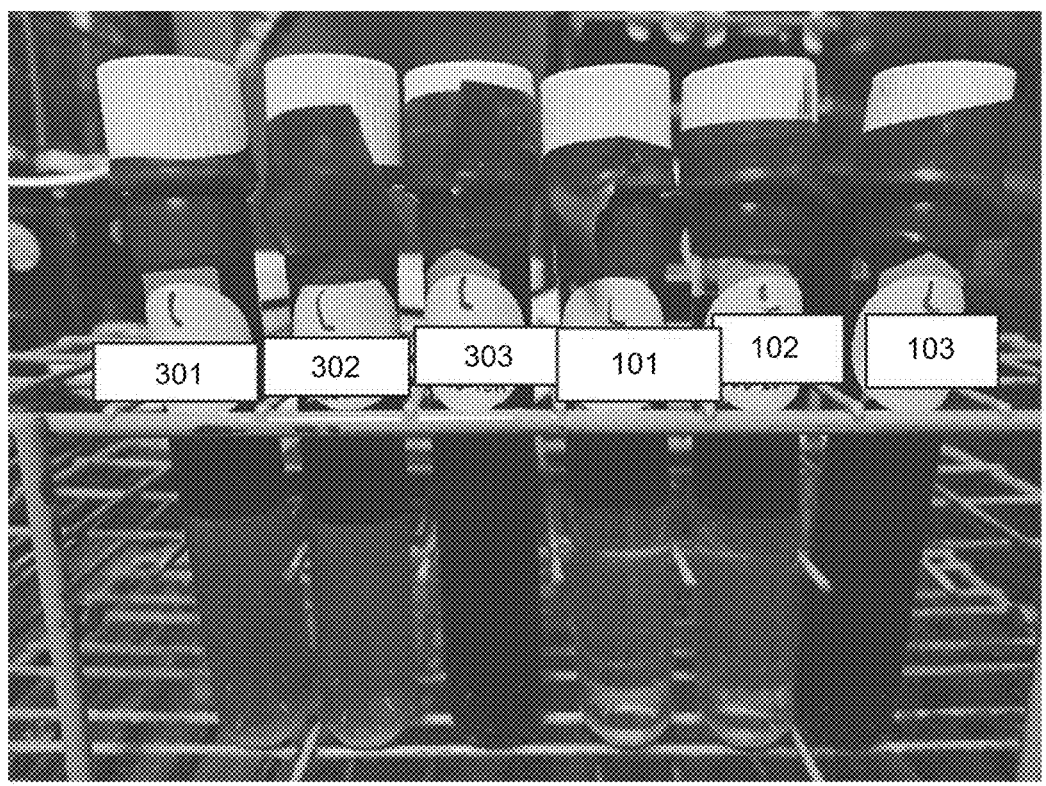
FIG. 2 is a photograph of sample mixtures of oil and aqueous fluid subjected to a sludge tendency test conducted at reservoir temperature and live acid conditions.
Figure 3:
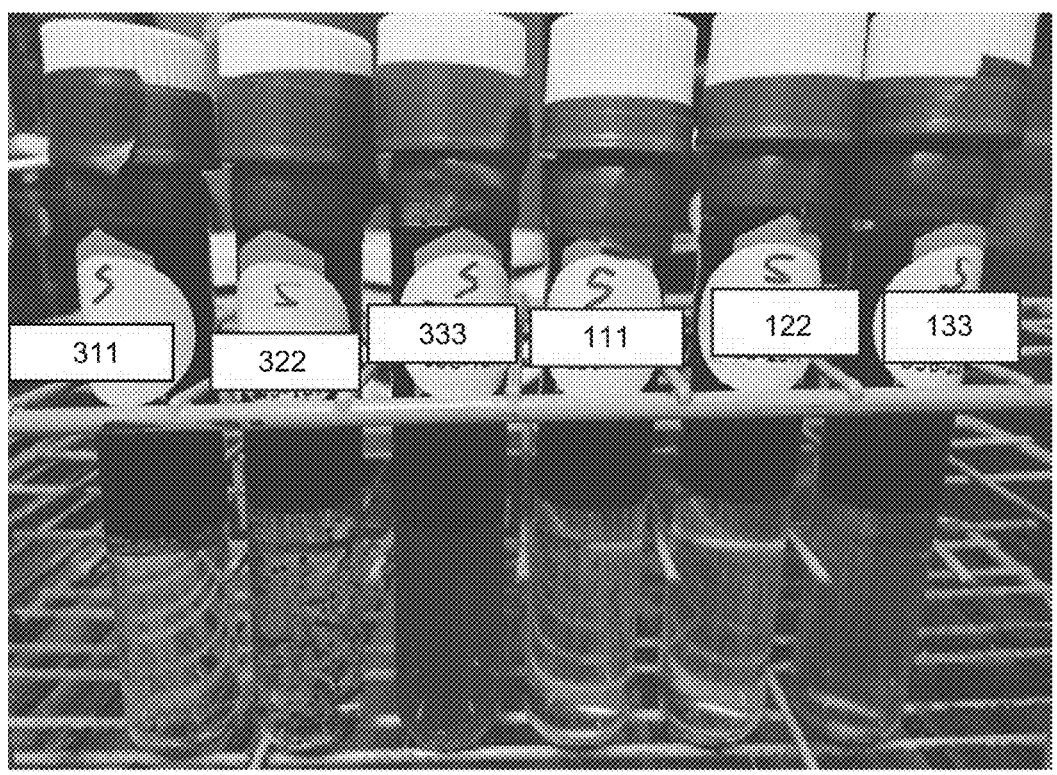
FIG. 3 is a photograph of sample mixtures of oil and aqueous fluid subjected to a sludge tendency test conducted at reservoir temperature and spent acid conditions.

A sludge tendency test was conducted at reservoir temperature and live/spent acid conditions in order to observe how well the oil phase separates from the water phase after mixing. Ideally, the interface should be clear of emulsion pads and no sludge should be present in either the acid or water phase. FIGS. 2 and 3 present sludge tendencies for the blank, NE, and WE surfactant at both live (FIG. 2) and spent (FIG. 3) acid conditions, based upon crude oil taken from Wells 1 and 3. In particular, FIG. 2 shows control fluids (i.e., non-surfactant-containing, or blank, fluids) 101 and 301 from Wells 1 and 3, respectively; it also shows oil samples with NE surfactant (102 and 302) from Wells 1 and 3, respectively, and samples with WE surfactant (103 and 303) from Wells 1 and 3, respectively. Likewise, FIG. 3 shows control fluids 111 and 311 from Wells 1 and 3; NE-surfactant-containing samples 122 and 322 from Wells 1 and 3; and WE-surfactant-containing samples 133 and 333 from Wells 1 and 3. It is clear that the interfaces in each oil and acid mixture appear to be free of sludge. For the WE surfactant in both the live samples 103 and 303 and spent samples 133 and 333, the acid phase appears darker, which is a typical result of oil molecules being dispersed and generating oil in acid emulsions.

Emulsion tendency was monitored by placing the samples from Well No. 1 and Well No. 3 (both the samples mixed with NE-containing acid and the samples mixed with WE-containing acid) in an emulsion dispersion analyzer at ambient temperature, and the oil/acid separation rates were tracked by light scattering. The results are shown in FIG. 1, as determined using an emulsion dispersion analyzer at 10 minutes after mixing with either the NE-containing treatment fluid or the WE-containing treatment fluid, as labeled in FIG. 1. As shown in FIG. 1, the separation index/rate as quantified by the emulsion dispersion analyzer was far greater for NE surfactant-containing treatment fluids, thereby showing the greater emulsion tendency of treatment fluids including WE surfactant.

Example 2

Figure 4:
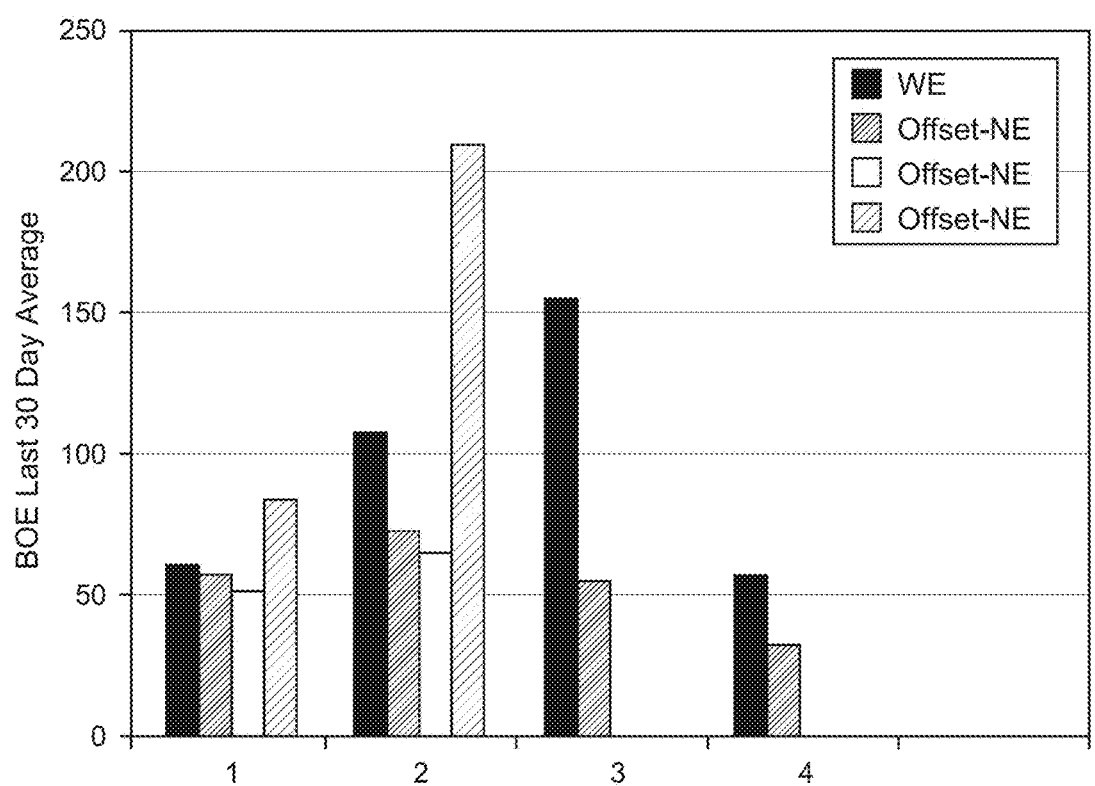
FIG. 4 is a graph illustrating comparison of production between wells treated with treatment fluids including a WE surfactant, and nearby offset wells treated with treatment fluids including a NE surfactant.

Four wells in the low permeability Monterrey formation in California were selected and completed with treatment fluids comprising lauryl hydroxysultaine, an amphoteric WE surfactant that tends to be come more anionic at pH above 2, in accordance with various embodiments of the present disclosure. The average barrel of oil equivalent (BOE) of the first 30 days was compared to eight offset wells, wherein treatment fluids instead comprising a non-ionic NE surfactant were used. As shown in FIG. 4, BOE from those four wells was higher than in six out of eight offsets, indicating that the use of WE surfactants in accordance with various embodiments of the present disclosure may enable incremental increases in production.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing a treatment fluid that comprises a weakly emulsifying surfactant and an aqueous base fluid; wherein the weakly-emulsifying surfactant comprises a compound selected from the group consisting of: an ethoxylated long-chain alcohols, a polyglucoside, an alkyl ammonium bromide; an alkoxylated sulfate; a hydroxysultaine; and any combination thereof;
introducing the treatment fluid into at least a portion of a subterranean formation at or above a pressure sufficient to create or enhance one or more fractures in the subterranean formation; and
forming one or more short-lived oil-in-water emulsions within the subterranean formation.

2. The method of claim 1, wherein the weakly-emulsifying surfactant comprises the alkyl ammonium bromide; wherein the alkyl ammonium bromide comprises an alkyl chain having between 1 and 50 carbon atoms.

3. The method of claim 1, wherein the weakly-emulsifying surfactant comprises the hydroxysultaine; wherein the hydroxysultaine is selected from the group consisting of: cocoamidopropyl hydroxysultaine, lauramidopropyl hydroxysultaine, lauryl hydroxysultaine, and any combination thereof.

4. The method of claim 1, further comprising:
allowing at least a portion of the weakly emulsifying surfactant to interact with at least a portion of the oil, gas, or both of the subterranean formation so as to prevent the formation of acid-induced sludge;
wherein the treatment fluid contains substantially no anti-sludge agent in addition to the weakly emulsifying surfactant.

5. The method of claim 1, further comprising:
wherein the treatment fluid contains substantially no penetrating surfactant in addition to the weakly emulsifying surfactant.

* * * * *